Aug. 15, 1933.  J. L. WALTON  1,922,562
NITROGENOUS FERTILIZER AND METHOD OF PRODUCING SAME
Filed Feb. 17, 1930
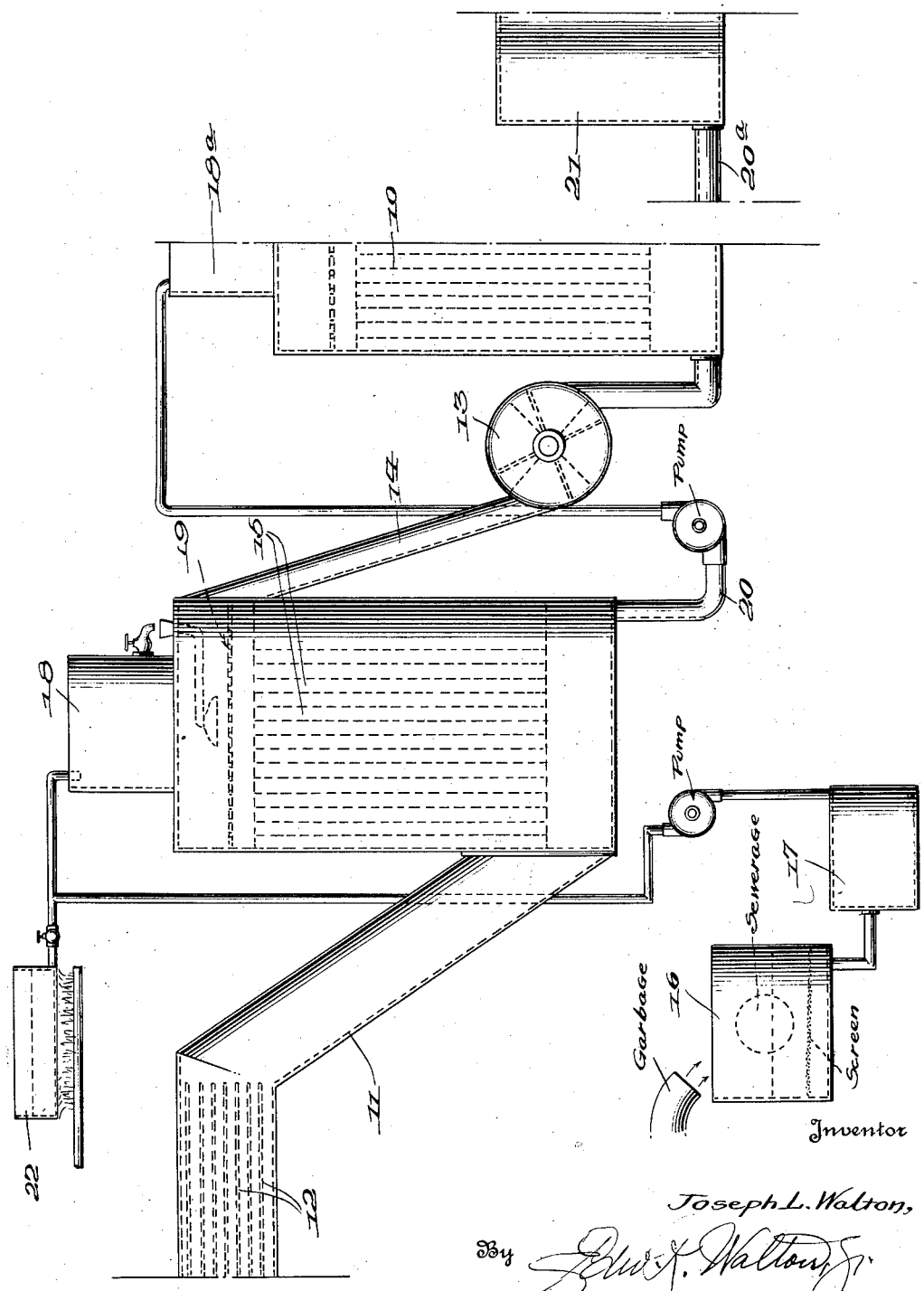
Inventor
Joseph L. Walton,
By 
Attorney Patented Aug. 15, 1933

1,922,562

UNITED STATES PATENT OFFICE 1,922,562

NITROGENOUS FERTILIZER AND METHOD OF PRODUCING SAME

Joseph L. Walton, Pinole, Calif.

Application February 17, 1930. Serial No. 429,129

3 Claims. (Cl. 71—6)

The present invention relates to the production of a cheap high grade fertilizer by an improved method.

The invention is based upon bringing together, under the herein disclosed manner, two materials, which usually go to waste, and converting them into a cheap material that can be used in the manufacture of a high grade fertilizer at very low cost.

In order that the invention may be better understood reference is made to the accompanying drawing in which an apparatus is diagrammatically disclosed and through the medium of which the method may be practiced.

The invention proposes to make use of flue or gaseous products of combustion from furnaces or the like, and of sewerage, garbage, or the like. In carrying the method into practice a system of contact towers are employed, about six in number, more or less, as may be found to give the best results. Into the first of these towers 10 furnace gases (which are ordinarily wasted and go to the atmosphere) are led at a proper temperature from the furnace flue through a flue or conduit 11. A suitable cooling apparatus 12 is positioned at the entrance end of the conduit 11 and by which the temperature of the gases may be reduced if necessary.

Now these combustion gases being led to the bottom of the tower 10, they are drawn upwardly through the tower by a fan 13 disposed in a conduit 14 connecting the top of the tower with the bottom of the next succeeding tower. The towers 10 are preferably constructed to have a plurality of vertical tubes or passages 15 therein, the ends of the tubes terminating at a distance from the tops and bottoms, respectively, of the towers.

Sewerage, night soil, garbage and other vegetable or organic waste material is gathered into a vat or container 16 and permitted to decompose either in the presence of water contained in said material, or which, if necessary, is added thereto. This water is then drawn off into a second container or reservoir 17, the solid matter, or as much as practical, being removed from the liquid by screening. Calcium hydrate is added to the liquid in the vat 16 but not enough to neutralize the carbonic acid present. From the reservoir 17 the liquid is pumped to a wooden tank 18 of the first series of towers 10. These tanks may be mounted on the tops of the towers.

A catalytic agent, from a supply source 22 mixes with the liquid coming into the first tank 18, at least, to facilitate the adsorption of various or certain products or gases from the flue gases by the liquid from the night soil or garbage. The catalytic agent may be in the form of a sulphuric acid solution of about five percent and heated to about 120 degrees Fahrenheit, adding scrap iron to the solution until it becomes neutral, and is drawn into the tower 18, at least, with the flow of liquid from the reservoir 17.

This liquid with the catalyzer present passes from the first tank 18, preferably by gravity, over a spreader 19 so as to break up the fluid into fine streams to pass down the sides of the tubes 15 and thereby intimately contacts with the flue gases being drawn upwardly through the tower.

As this liquid passes down through the towers with the catalyzer present therein, it will absorb certain elements or products from the gaseous products of combustion at a temperature of about 80 degrees Fahrenheit.

The resultant liquid passes off through a pipe 20 and, if a second tower is used, is pumped upwardly to a tank 18a, similar to the tank 18, where the operation just described is again repeated. This operation may be repeated as many times as necessary to secure the best results, but it is thought that the provision of six contact towers would be ordinarily sufficient for obtaining the desired results.

The gases remaining in the last of the series of towers, after contact with the liquids, are discharged to the atmosphere, while the liquid which passes through the last towers is led to a reservoir 21.

This liquid may be conveyed by any suitable means to leaves or straws, or other absorbent material, from which a good vegetable mold will develop, and there allowed to ferment or rot, thus producing a very cheap fertilizer material extremely high in nitrogen. However, the liquid may be used directly on the ground as a fertilizer. This nitrogenous liquid may be sprayed upon the absorbent material or poured into pits containing the absorbent material, or may be mixed therewith in any desirable or approved manner.

Having thus described the invention and the manner in which the same is to be performed that which is desired to secure by Letters Patent is:

1. The method of producing fertilizer including decomposing waste organic material in the presence of water, adding calcium hydrate to the resultant liquid of the decomposition, bringing said liquid into contact with gaseous products of combustion.

2. A method of producing nitrogenous fertilizer including decomposing waste organic material in the presence of water, adding calcium hydrate to the resultant liquid of the decomposition bringing said liquid into contact with gaseous products of combustion, and absorbing said liquid with a material which will produce a vegetable compost.

3. A method of producing nitrogenous fertilizer including decomposing waste organic material in the presence of water, adding calcium hydrate to the resultant liquid of the decomposition, then adding to said liquid about five percent of sulphuric acid solution heated to a temperature approximately 120 degrees Fahrenheit in the presence of iron, then bringing said liquid into contact with gaseous products of combustion at a temperature about 80 degrees Fahrenheit, and absorbing said liquid with the material which will produce a vegetable mold.

JOSEPH L. WALTON.